(12) United States Patent
Utashima et al.

(10) Patent No.: US 11,643,543 B2
(45) Date of Patent: May 9, 2023

(54) RESIN COMPOSITION

(71) Applicant: ASAHI KASEI KABUSHIKI KAISHA, Tokyo (JP)

(72) Inventors: Kenji Utashima, Tokyo (JP); Tomohiro Kondou, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 209 days.

(21) Appl. No.: 17/337,439

(22) Filed: Jun. 3, 2021

(65) Prior Publication Data

US 2021/0380798 A1     Dec. 9, 2021

(30) Foreign Application Priority Data

Jun. 3, 2020 (JP) .............................. JP2020-096996

(51) Int. Cl.
    *C08L 59/00*     (2006.01)
    *C08K 3/08*     (2006.01)
    *C08K 5/01*     (2006.01)

(52) U.S. Cl.
    CPC .............. *C08L 59/00* (2013.01); *C08K 3/08* (2013.01); *C08K 5/01* (2013.01); *C08K 2003/0812* (2013.01); *C08K 2201/003* (2013.01); *C08K 2201/005* (2013.01)

(58) Field of Classification Search
    None
    See application file for complete search history.

(56) References Cited

U.S. PATENT DOCUMENTS

| | | | | |
|---|---|---|---|---|
| 2010/0261817 A1* | 10/2010 | Asai | ........................ | C08L 71/02 524/99 |
| 2010/0280156 A1* | 11/2010 | Hase | ........................ | C08K 5/13 524/99 |
| 2013/0035416 A1* | 2/2013 | Horio | ........................ | C08K 3/08 524/192 |
| 2016/0237275 A1* | 8/2016 | Mäder | ................... | C08K 5/005 |
| 2020/0126200 A1 | 4/2020 | Sano | | |

FOREIGN PATENT DOCUMENTS

| | | | |
|---|---|---|---|
| JP | S61159453 A | 7/1986 | |
| JP | S6220574 A | 1/1987 | |
| JP | 2003342021 A | 12/2003 | |
| JP | 2009155418 A | 7/2009 | |
| JP | 2011140577 A | 7/2011 | |
| JP | 2016023253 A | 2/2016 | |
| JP | 2017226784 A | 12/2017 | |
| JP | 2020007528 A | 1/2020 | |
| WO | 2013049541 A1 | 4/2013 | |
| WO | WO-2013049541 A1 * | 4/2013 | ............... C08K 3/08 |
| WO | 2017127649 A1 | 7/2017 | |

* cited by examiner

*Primary Examiner* — Satya B Sastri
(74) *Attorney, Agent, or Firm* — Kenja IP Law PC

(57) ABSTRACT

The present disclosure is directed to provide a resin composition which enables production of a molded product generating less formaldehyde and having excellent appearance and weather resistance, and also achieves suppression of mold deposit during molding. Presently disclosed is a polyacetal resin composition comprising 100 parts by mass of a polyacetal resin (A); and 0.1 to 10 parts by weight of an aluminum pigment (B), the aluminum pigment (B) containing 0.1 to 2.0 mass % of particles with a particle diameter of 1 μm or less with respect to a total amount of the aluminum pigment (B), and a volume average particle size of the aluminum pigment (B) being 3 to 40 μm.

4 Claims, No Drawings

RESIN COMPOSITION

TECHNICAL FIELD

The present disclosure relates to a resin composition.

BACKGROUND

Crystalline resins such as polyolefin, polyacetal, or polyamide, where crystals with regularly arranged molecular chains are present, have a lot of useful characteristics such as high mechanical strength and rigidity, and excellent chemical resistance. They are easily processed, and therefore have conventionally been widely used mainly for mechanism components and sliding components in precision equipment, home electronics, OA equipment, automobiles, industrial materials, miscellaneous goods, and the like. In particular, metallic color pigments made of metal particles, typified by scale-like aluminum powders (hereinafter, also referred to as "aluminum flake"), are compounded in various crystalline resins in order to impart a characteristic metallic gloss feeling called a metallic tone. Resin compositions to which such metallic color pigments are compounded are used for interior and exterior components for automobiles, personal computer casings, and the like.

For example, there have been made attempts to impart any design by molding of a resin having a glossy pigment for exhibition of metallic gloss properties for resin compositions described in PTLs 1 to 5 listed below. Specifically, JP S62-020574 A (PTL 1) and JP S61-159453 A (PTL 2) each have disclosed a synthetic resin composition molded article to which a specified metallic pigment is compounded. JP 2010-065210 A (PTL 3) has proposed a resin composition including a polyacetal resin, a weathering agent, aluminum particles having specified particle size, particle size distribution, and particle thickness, and a specified fatty acid, as a resin composition being excellent in production stability, mechanical properties, molding appearance, weld performance, and lightness. JP 2009-155418 A (PTL 4) has proposed a polyacetal resin composition including a polyacetal resin, a guanamine compound, a weathering agent, a specified metallic pigment, as the composition not only being excellent in weather resistance, but also being generated less formaldehyde originated from a molded product. Further, WO 2013/49541 A1 (PTL 5) has disclosed a molded product having a metallic appearance obtained from a polymer composition including a polyacetal resin in a content of about 60 weight % or more, a metal pigment, and an ultraviolet stabilizer. PTL 5 has proposed a technique in which the metal pigment is present and is dispersed in the polymer composition in an amount and to the extent sufficient for imparting glossiness greater than about 45 gloss to an outer surface of a molded product to be obtained when the glossiness of the molded product is measured at an angle of 60 degrees.

CITATION LIST

Patent Literature

PTL 1: JP S62-020574 A
PTL 2: JP S61-159453 A
PTL 3: JP 2010-065210 A
PTL 4: JP 2009-155418 A
PTL 5: WO 2013/49541 A1

SUMMARY

When, however, the technique disclosed in PTL 1 or PTL 2 is applied to a polyacetal resin, there is any influence by generation of heat in melting and mixing or by an active site on a metal particle surface, and therefore sufficient effects are not obtained from the above-described attempts on suppression of the amount of formaldehyde generated and improvements in appearances such as glossiness of a product. The resin composition disclosed in PTL 3 has not been studied about the influence of the composition on the amount of formaldehyde generated, the influence of the amount of formaldehyde generated on appearances such as glossiness of a product, and the like.

On the other hand, PTL 4 has proposed a technique for the purposes of imparting heat stability of a molded article and suppressing formaldehyde. However, the polyacetal resin composition added with a material in which aluminum powder(s) in the capacity of a metallic pigment is dispersed in polyethylene is merely provided, and neither there have been made any studies about the influence on appearances such as glossiness and brightness of a molded article obtained, nor there have been obtained any sufficient effects about such appearances such as glossiness and brightness of the product. In addition, as in the technique disclosed in PTL 5, when an attempt is made to produce a molded article having a high glossiness using an aluminum pigment, mold deposit caused by pigment particles may occur. Under the circumstances as described above, there has been a demand for a polyacetal resin composition which generates less formaldehyde during processing such as injection molding, as well as having excellent appearance and weather resistance.

Accordingly, it would be thus helpful to provide a polyacetal resin composition which enables production of a molded product generating less formaldehyde and having excellent appearance and weather resistance, and also achieves suppression of mold deposit during molding.

Through extensive studies, the present inventors have discovered that inclusion of an aluminum pigment which contains particles such as aluminum fine particles with a particle diameter of 1 µm or less in a specified amount and has a volume average particle size within a specified range to a polyacetal resin can provide a resin composition which enables production of a molded product generating less formaldehyde and having excellent appearance and weather resistance, and also achieves suppression of mold deposit during molding, to thereby complete the present disclosure.

(1) Presently disclosed is a polyacetal resin composition comprising:
100 parts by mass of a polyacetal resin (A); and
0.1 to 10 parts by weight of an aluminum pigment (B),
the aluminum pigment (B) containing 0.1 to 2.0 mass % of particles with a particle diameter of 1 µm or less with respect to a total amount of the aluminum pigment (B), and a volume average particle size of the aluminum pigment (B) being 3 to 40 µm.

(2) Preferably, the polyacetal resin composition according to the present disclosure further comprises a lubricant (C).

(3) Preferably, the polyacetal resin composition according to the present disclosure, 1 to 4 parts by mass of the aluminum pigment (B) is contained per 100 parts by mass of the polyacetal resin (A).

The present disclosure can provide a polyacetal resin composition which enables production of a molded product generating less formaldehyde and having excellent appearance and weather resistance, and also achieves suppression of mold deposit during molding.

DETAILED DESCRIPTION

Hereinafter, an embodiment for carrying out the present disclosure (hereinafter referred to as "the present embodiment") will be described in detail. The present disclosure is not intended to be limited to the following description, and can be variously modified and carried out within the scope thereof.

[Polyacetal Resin Composition]

A polyacetal resin composition of the present embodiment comprises 100 parts by mass of a polyacetal resin (A) and 0.1 to 10 parts by mass of an aluminum pigment (B), the aluminum pigment (B) containing 0.1 to 2.0 mass % of particles with a particle diameter of 1 μm or less with respect to a total amount of the aluminum pigment (B), and a volume average particle size of the aluminum pigment (B) being 3 to 40 μm.

(Polyacetal Resin (A))

The polyacetal resin (A) in the present disclosure is not particularly limited, and a conventionally known polyacetal can be used. The polyacetal resin (A) can be used singly or in combinations of a plurality thereof. Examples of the polyacetal resin (A) include a polyoxymethylene homopolymer substantially made of an oxymethylene unit —($CH_2O$)—, obtained through homopolymerization of formaldehyde or a cyclic oligomer such as trioxane and tetraoxane, or a polyoxymethylene copolymer having a structure where an oxyalkylene unit (1) represented by the following general formula (1) is randomly inserted into a continuous chain made of an oxymethylene unit —($CH_2O$)—, obtained through copolymerization of formaldehyde and/or trioxane with a cyclic ether and/or a cyclic formal:

[Formula 1]

(1)

(in the above formula (1), $R_1$ and $R_2$ each independently represent a hydrogen atom, an alkyl group, or an aryl group, $R_1$ and $R_2$ may be the same or different from each other, and n is an integer of 2 to 6).

The polyoxymethylene copolymer used in the present embodiment as an example of the polyacetal resin (A) also encompasses a branched polyoxymethylene copolymer in which a molecular chain is branched, and a polyoxymethylene block copolymer with a heterogeneous block in which the amount of the repeating unit of oxymethylene is 50 mass % or more.

The insertion rate of the oxyalkylene unit (1) represented by the general formula (1) in the polyoxymethylene copolymer is preferably 0.01 mol or more and 50 mol or less, and more preferably in the range of 0.03 mol or more and 20 mol or less, per 100 mol of the oxymethylene unit.

The alkyl group in the general formula (1) is preferably a linear, branched, or cyclic alkyl group having 1 to 3 carbon atoms, and more preferably a linear alkyl group having 1 to 2 carbon atoms. The aryl group in the general formula (1) is preferably an aryl group having 6 to 8 carbon atoms, and —C= or —C— in the aryl group having 6 to 8 carbon atoms may be substituted with N, S, or O.

Examples of the oxyalkylene unit (1) represented by the general formula (1) include an oxyethylene unit, an oxypropylene unit, an oxytetramethylene unit, an oxybutylene unit, and an oxyphenylethylene unit. Among these oxyalkylene units (1), an oxyethylene unit is more preferred from the viewpoint of enhancing physical properties of the polyacetal resin composition.

The polyacetal resin (A) obtained through homopolymerization or copolymerization is desirably subjected to a terminal stabilization treatment. The terminal stabilization treatment method used is, for example, a method including esterification, etherification, urethanization, or the like of a hydroxyl group at a terminal, or a method including stabilization of an unstable moiety at a terminal by hydrolysis.

The polyacetal resin (A) subjected to a terminal stabilization treatment is obtained by, for example, continuous feeding to a counter-rotating non-intermeshing twin screw extruder where a step of subjecting a molecular terminal of a polyoxymethylene copolymer obtained through copolymerization of formaldehyde and/or trioxane with a cyclic ether and/or a cyclic formal, to a stabilization treatment immediately after the polymerization, thereafter a step of pouring water or an alcohol, or a mixture thereof and kneading the resultant in a molten state, and a devolatilization step of releasing vapor of a hydroxyl group-containing compound, for example, the water, and free formaldehyde can be performed. When the water, alcohol or mixture thereof is poured and the resultant is kneaded, a basic substance such as triethylamine is preferably added as a pH adjuster.

In the present disclosure, the melt flow rate (MFR; according to ASTM D57E, temperature condition: 190° C.) of the polyacetal resin (A) is preferably 2.5 to 40 g/10 minutes, more preferably 3 to 30 g/10 minutes. When the MFR is adjusted in any of the above ranges, the resin composition achieves mechanical properties, and heat stability and the amount of formaldehyde generated in retention molding, in a well-balanced manner.

The polyacetal resin (A) in the present embodiment is preferably a polyoxymethylene copolymer in which an oxyethylene unit is inserted. The insertion rate of the oxyalkylene unit in the polyoxymethylene copolymer is preferably 0.01 mol or more and 50 mol or less, and more preferably in the range of 0.03 mol or more and 20 mol or less, per 100 mol of the oxymethylene unit.

<Stabilizer Contained in Polyacetal Resin (A)>

In the present embodiment, the polyacetal resin (A) preferably contains a stabilizer used in conventional polyacetal resins. In the present embodiment, the polyacetal resin (A) is preferably a copolymer, and when the polyacetal resin (A) is a copolymer, it is more preferable that the polyacetal copolymer resin contains a stabilizer used in conventional polyacetal resins.

Examples of the stabilizer include an antioxidant, a scavenger for scavenging formaldehyde or formic acid, and a hindered amine-based stabilizer and an ultraviolet absorber which act as a weathering stabilizer. These may be used alone, but combining two or more of them is preferable because the effects is exhibited to a high extent.

The antioxidant is preferably a hindered phenol-based antioxidant, and examples thereof include n-octadecyl-3-(3'5'-di-t-butyl-4'-hydroxyphenyl)-propionate, n-octadecyl-3-(3'-methyl-5'-t-butyl-4'-hydroxyphenyl)-propionate, n-tetradecyl-3-(3'5'-di-t-butyl-4'-hydroxyphenyl)-propionate, 1, 6-hexanediol-bis-(3-(3,5-di-t-butyl-4-hydroxyphenyl)-propionate), 1,4-butanediol-bis-(3-(3,5-di-t-butyl-4-hydroxyphenyl)-propionate), and triethylene glycol-bis-(3-(3-t-butyl-5-methyl-4-hydroxyphenyl)-propionate).

Other examples of the hindered phenol-based antioxidant include tetrakis-(methylene-3-(3',5'-di-t-butyl-4'-hydroxyphenyl)propionatemethane, 3,9-bis(2-(3-(3-t-butyl-4-hydroxy-5-methylphenyl)propionyloxy)-1,1-dimethy lethyl)-2,4,8,10-tetraoxaspiro(5,5)undecane, N,N'-bis-3-(3',5'-di-t-butyl-4-hydroxyphenyl)pripionylhexamethylenediamine, N,N'-tetramethylenebis-3-(3'-methyl-5'-t-butyl-4-hydroxyphenyl)propionyldia mine, N,N'-bis-(3-(3,5-di-t-butyl-4-hydroxyphenyl)propionyl)hydrazine, N-salicyloyl-N'-salicylidenehydrazine, 3-(N-salicyloyl)amino-1,2,4-triazole, and N,N'-bis(2-(3-(3,5-di-butyl-4-hydroxyphenyl)propionyloxy)ethyl)oxamide.

Among the hindered phenol-based antioxidants mentioned above, triethylene glycol-bis-(3-(3-t-butyl-5-methyl-4-hydroxyphenyl)-propionate) and tetrakis-(methylene-3-(3',5'-di-t-butyl-4'-hydroxyphenyl)propionate methane are preferred.

The amount of the hindered phenol-based antioxidant in the present embodiment is in the range of preferably 0.01 to 2 parts by mass, more preferably 0.02 to 1 part by mass per 100 parts by mass of the polyacetal resin (A). When the amount is 0.01 to 2 parts by mass, the polyacetal resin composition of the present embodiment is enhanced in heat stability during a molding process, and thus has favorable heat stability.

The scavenger is preferably a compound having a scavenging ability to scavenge formaldehyde or formic acid, and examples thereof include a compound and a polymer containing formaldehyde-reactive nitrogen, a fatty acid calcium salt, and a hydroxide, an inorganic acid salt, a carboxylate, and an alkoxide of an alkali metal or alkaline earth metal.

Examples of the compound containing formaldehyde-reactive nitrogen include dicyandiamide, amino-substituted triazine, and a co-condensate of amino-substituted triazine and formaldehyde.

Examples of the amino-substituted triazine includes guanamine (2,4-diamino-sym-triazine), melamine (2,4,6-triamino-sym-triazine), N-butyl melamine, N-phenyl melamine, N,N-diphenyl melamine, N,N-diaryl melamine, N,N', N"-triphenylmelamine, N-methylol melamine, N,N'-dimethylol melamine, N,N',N"-trimethylol melamine, and benzoguanamine (2,4-diamino-6-phenyl-sym-triazine). Also, 2,4-diamino-6-methyl-sym-triazine, 2,4-diamino-6-butyl-sym-triazine, 2,4-diamino-6-benzyloxy-sym-triazine, 2,4-diamino-6-butoxy-sym-triazine, 2,4-diamino-6-cyclohexyl-sym-triazine, 2,4-diamino-6-chloro-sym-triazine, 2,4-diamino-6-mercapto-sym-triazine, 2,4-dioxy-6-amino-sym-triazine (amerite), 2-oxy-4,6-diamino-sym-triazine (amerin), and N, N,N',N'-tetracyanoethyl benzoguanamine are exemplified.

An example of the co-condensate of amino-substituted triazine and formaldehyde is a melamine-formaldehyde polycondensate, for example.

Among the additives described above, dicyandiamide, melamine, and a melamine-formaldehyde polycondensate are preferred.

Examples of the polymer containing formaldehyde-reactive nitrogen as one type of the scavenger include (i) a polyamide resin; (ii) a polymer obtained through polymerization of acrylamide and a derivative thereof or acrylamide and a derivative thereof and another vinyl monomer in the presence of a metal alcoholate; (iii) a polymer obtained through polymerization of acrylamide and a derivative thereof or acrylamide and a derivative thereof and another vinyl monomer in the presence of radical polymerization initiator; and (iv) a polymer having a nitrogen atom such as an amine, an amide, urea, and urethane, for example.

Examples of the polyamide resin include, Nylon 4-6, Nylon 6, Nylon 6-6, Nylon 6-10, Nylon 6-12, Nylon 12, and copolymers of these, such as Nylon 6/6-6, Nylon 6/6-6/6-10, and Nylon 6/6-12, for example.

Examples of the polymer obtained through polymerization of acrylamide and a derivative thereof or acrylamide and a derivative thereof and another vinyl monomer in the presence of a metal alcoholate include a poly-β-alanine copolymer.

These polymers and copolymers can be produced by the methods described in literature, namely, JP H6-12259 B (U.S. Pat. No. 5,015,707 B), JP H5-87096 B, JP H5-47568 B, and JP H3-234729 A.

Examples of the fatty acid calcium salt as one type of the scavenger include a calcium salt of a saturated or unsaturated fatty acid having 10 to 36 carbon atoms, which may be substituted with a hydroxyl group.

Examples of the saturated fatty acid include capric acid, lauric acid, myristylic acid, palmitic acid, stearic acid, arachidic acid, behenic acid, lignoseric acid, serotinic acid, montanic acid, melicic acid, and seroplastic acid, for example.

Examples of the unsaturated fatty acid include undecylenic acid, oleic acid, elaidic acid, cetrainic acid, erucic acid, brasidic acid, sorbic acid, linoleic acid, linolenic acid, arachidonic acid, propiolic acid, and stearolic acid, for example.

Among these fatty acids, palmitic acid, stearic acid, and 12-hydroxystearic acid are particularly preferred.

Examples of the hydroxide, the inorganic acid salt, the carboxylate, or the alkoxide of the alkali metal or the alkali earth metal as one type of the scavenger include hydroxides of sodium, potassium, magnesium, calcium, barium, and the like, and carbonates, phosphates, silicates, borates, and carboxylates of these metals.

Note that the fatty acid calcium salts described above are excluded from carboxylates.

Examples of the carboxylic acid corresponding to the carboxylate include saturated or unsaturated aliphatic carboxylic acids having 10 to 36 carbon atoms, and these carboxylic acids may be substituted with a hydroxyl group.

Examples of the saturated aliphatic carboxylic acid include capric acid, lauric acid, myristic acid, palmitic acid, stearic acid, arachidic acid, behenic acid, lignoseric acid, serotinic acid, montanic acid, melicic acid, and seroplastic acid, for example.

Examples of the unsaturated aliphatic carboxylic acid include undecylenic acid, oleic acid, elaidic acid, cetrainic acid, erucic acid, brassinic acid, sorbic acid, linoleic acid, linolenic acid, arachidonic acid, propiolic acid, and stearolic acid, for example.

Examples of the alkoxide include methoxides and ethoxides of the above-described metals.

In the present embodiment, the amount of the compound and the polymer containing formaldehyde-reactive nitrogen, the fatty acid calcium salt, the hydroxide, the inorganic acid salt, the carboxylate, or the alkoxide of an alkali metal or an alkali earth metal, which is one type of the scavenger, is preferably in the range of 0.01 to 1 part by mass and is more preferably 0.02 to 0.5 parts by mass, per 100 parts by mass of the polyacetal resin (A). When the amount is 0.01 to 1 part by mass, an enhancement in heat stability and a reduction in the amount of formaldehyde generated from the molded article during a molding process of the polyacetal resin composition of the present embodiment are achieved, and favorable heat aging resistance is obtained.

Examples of the weathering stabilizer include a hindered amine-based stabilizer and an ultraviolet absorber.

Examples of the hindered amine-based stabilizer include a piperidine derivative having a sterically hindering group, and examples of such a derivative include an ester group-containing piperidine derivative, an ether group-containing piperidine derivative, an amide group-containing piperidine derivative, and a polycondensate of a piperidine derivative having a high molecular weight.

Examples of the ester group-containing piperidine derivative include 4-acetoxy-2,2,6,6-tetramethylpiperidine, 4-stearoyloxy-2,2,6,6-tetramethylpiperidine, 4-acryloyloxy-2,2,6,6-tetramethylpiperidine, 4-benzoyloxy-2,2,6,6-tetramethylpiperidine, 4-phenylcarbamooxy-2,2,6,6-tetramethylpiperidine, bis(2,2,6,6-tetramethyl-4-piperidyl)oxalate, bis(2,2,6,6-tetramethyl)-4-piperidyl)malonate, bis(1,2,2,6,6-pentamethyl-4-piperidyl) [[3,5-bis(1,1-dimethylethyl)-4-hydroxyphenyl]methyl]butylmalonate, bis(2,2,6,6-tetramethyl-4-piperidyl)adipate, bis(1,2,2,6,6-pentamethyl-4-piperidyl)adipate, bis(1-methyl-2,2,6,6-tetramethyl-4-piperidyl)adipate, bis(2,2,6,6-tetramethyl-4-piperidyl)sebacate, bis(1,2,2,6,6-pentamethyl-4-piperidyl)sebacate, bis(1-octyloxy-2,2,6,6-tetramethyl-4-piperidyl sepate, bisdecanedioate (2,2,6,6-tetramethyl-1-(octyloxy)-4-piperidinyl))ester, bis(2,2,6,6-tetramethyl-4-piperidyl)terephthalate, tris(2,2,6,6-tetramethyl-4-piperidyl)benzene-1,3,5-tricarboxylate, and tetrakis(1,2,2,6,6-pentamethyl-4-piperidyl) 1,2,3,4-butanetetracarboxylate, for example.

Examples of the ether group-containing piperidine derivative include 4-methoxy-2,2,6,6-tetramethylpiperidine, 4-cyclohexyloxy-2,2,6,6-tetramethylpiperidine, 4-phenoxy-2,2,6,6-tetramethylpiperidine, 4-benzyloxy-2,2,6,6-tetramethylpiperidine, and 1,2-bis(2,2,6,6-tetramethyl-4-piperidyloxy)ethane, for example.

Examples of the amide group-containing piperidine derivative include 4-(phenylcarbamoyloxy)-2,2,6,6-tetramethylpiperidine and bis(2,2,6,6-tetramethyl-4-piperidyl)hexamethylene-1,6-dicarbamate, for example.

Further, examples of the polycondensate of a piperidine derivative having a high molecular weight include a polycondensate of dimethyl 1-(2-hydroxyethyl)-4-hydroxy-2,2,6,6-tetramethylpiperidine succinate; a condensate of 1,2,3,4-butanetetracarboxylic acid, 1,2,2,6,6-pentamethyl-4-piperidinol, and tridecyl alcohol; and a condensate of 1,2,3,4-butanetetracarboxylic acid, 1,2,2,6,6-pentamethyl-4-piperidinol, and β,β,β',β'-tetramethyl-3,9-(2,4,8,10-tetraoxaspiro[5,5]undecane)diethanol, for example.

The hindered amine-based stabilizers described above may be used alone or may be used in combination of two or more thereof.

Among them, preferred hindered amine-based stabilizers are bis(1,2,2,6,6-pentamethyl-4-piperidinyl)sebacate; bis-(N-methyl-2,2,6,6-tetramethyl-4-piperidinyl)sebacate; bis(2,2,6,6-tetramethyl-4-piperidinyl)sebacate; and a condensate of 1,2,3,4-butanetetracarboxylic acid, 1,2,2,6,6-pentamethyl-4-piperidinol, and β,β,β',β'-tetramethyl-3,9-(2,4,8,10-tetraoxaspiro[5,5]undecane) diethanol.

In the present embodiment, the content of the hindered amine-based stabilizer is preferably 0.01 to 5 parts by mass, more preferably 0.1 to 2 parts by mass, even more preferably 0.1 to 1.5 parts by mass per 100 parts by mass of the polyacetal resin (A).

In the present embodiment, the polyacetal resin (A) preferably further contains an ultraviolet absorber as a weathering stabilizer. This enables a molded article obtained from the polyacetal resin composition of the present embodiment to achieve an enhancement effect of weather resistance (light stability).

Examples of the ultraviolet absorber include a benzotriazole-based compound, a benzophenone-based compound, an oxalic anilide-based compound, and a hydroxyphenyl-1,3,5-triazine-based compound.

Examples of the benzotriazole-based compound include benzotriazoles having a hydroxyl group and an aryl group substituted with an alkyl group (preferably an alkyl group having 1 to 6 carbon atoms), such as 2-(2'-hydroxy-5'-methylphenyl)benzotriazole, 2-(2'-hydroxy-3',5'-di-t-butylphenyl)benzotriazole, 2-(2'-hydroxy-3',5'-di-t-amylphenyl)benzotriazole, 2-(2'-hydroxy-3',5'-diisoamylphenyl)benzotriazole; benzotriazoles with a hydroxyl group and an aryl group substituted with an aralkyl group or an aryl group such as 2-[2'-hydroxy-3',5'-bis(α,α-dimethylbenzyl)phenyl]benzotriazole; and benzotriazoles having a hydroxyl group and an aryl group substituted with an alkoxy group (preferably an alkoxy group having 1 to 12 carbons) such as 2-(2'-hydroxy-4'-octoxyphenyl)benzotriazole, for example.

Preferred benzotriazole-based compounds are benzotriazoles having a hydroxyl group and an aryl group (particularly a phenyl group) having 6 to 10 carbon atoms substituted to an alkyl group having 3 to 6 carbon atoms, and benzotriazoles having a hydroxyl group and an aryl group substituted with an aryl having 6 to 10 carbon atoms—an alkyl group having 1 to 6 carbon atoms (particularly, a phenyl group substituted to an alkyl group having 1 to 4 carbon atoms).

Examples of the benzophenone-based compound include benzophenones having a plurality of hydroxyl groups; and benzophenones having a hydroxyl group and an alkoxy group (preferably an alkoxy group having 1 to 16 carbon atoms).

Examples of the benzophenones having a plurality of hydroxyl groups include di, tri, or tetrahydroxybenzophenone such as 2,4-dihydroxybenzophenone, and benzophenones having a hydroxyl group and a hydroxyl substituted-aryl or aralkyl group such as 2-hydroxy-4-benzyloxybenzophenone.

Further, examples of the benzophenone having a hydroxyl group and an alkoxy group include 2-hydroxy-4-methoxybenzophenone, 2-hydroxy-4-octoxybenzophenone, 2-hydroxy-4-dodecyloxybenzophenone, 2,2'-dihydroxy-4-methoxybenzophenone, 2,2'-dihydroxy-4,4'-dimethoxybenzophenone, and 2-hydroxy-4-methoxy-5-sulfobenzophenone, for example.

Examples of the oxalic acid anilide-based compound include N-(2-ethylphenyl)-N'-(2-ethoxy-5-t-butylphenyl) oxalic acid diamide, and N-(2-ethylphenyl)-N'-(2-ethoxyphenyl) oxalic acid diamide, for example.

Examples of the hydroxyphenyl-1,3,5-triazine-based compound include 2,4-diphenyl-6-(2-hydroxyphenyl)-1,3,5-triazine, 2,4-diphenyl-6-(2,4-dihydroxyphenyl)-1,3,5-triazine, 2,4-diphenyl-6-(2-hydroxy-4-methoxyphenyl)-1,3,5-triazine, 2,4-diphenyl-6-(2-hydroxy-4-ethoxyphenyl)-1,3,5-triazine, 2,4-diphenyl-6-(2-hydroxy-4-propoxyphenyl)-1,3,5-triazine, 2,4-diphenyl-6-(2-hydroxy-4-butoxyphenyl)-1,3,5-triazine, 2,4-diphenyl-6-(2-hydroxy-4-hexyloxyphenyl)-1,3,5-triazine, 2,4-diphenyl-6-(2-hydroxy-4-octyloxyphenyl)-1,3,5-triazine, and 2,4-diphenyl-6-(2-hydroxy-4-dodecyloxyphenyl)-1,3,5-triazine, for example.

Among the compounds described above as the ultraviolet absorber, benzotriazole-based compounds are preferred, and 2-[2'-hydroxy-3',5'-bis(α,β-dimethylbenzyl)phenyl]benzotriazole is more preferred.

In the present embodiment, the amount of the ultraviolet absorber is preferably from 0.1 to 5 parts by mass, more preferably from 0.1 to 2 parts by mass, and even more preferably from 0.1 to 1.5 parts by mass per 100 parts by mass of the polyacetal resin (A).

When the polyacetal resin composition of the present embodiment contains the ultraviolet absorber and the hindered amine-based stabilizer, the ratio of the ultraviolet absorber to the hindered amine-based stabilizer is preferably a mass ratio of ultraviolet absorber/hindered amine-based stabilizer in the range of 10/90 to 80/20, more preferably 10/90 to 70/30, and even more preferably 20/80 to 60/40.

(Aluminum Pigment (B))

Metal particles subjected to shaping processing contain fine particles which have been originally contained in the raw material metal powder, and fine particles generated from a portion of the raw material metal powder which was broken during the processing of the raw material metal powder.

Among these fine particles, when the metal particles contain a large amount of fine particles having a particularly small particle diameter of 1 μm or less, i.e., "particles with a particle diameter of 1 μm or less" (hereinafter such particles are referred to as "specified fine particles"), the VOC property of a resin material produced by adding the metal particles tends to be reduced and mold deposit tends to arise during molding of the resin material.

On the other hand, when a resin material is prepared through the above-described shaping processing followed by addition of metal particles from which specified fine particles have been removed for eliminating these adverse effects, sufficient glossiness cannot be achieved.

The polyacetal resin composition of the present embodiment is obtained through a method in which specified fine particles are removed after the shaping processing, followed by intentionally adding a specified amount of specified fine particles, or a method in which a part of specified fine particles contained after the shaping processing are removed, and the like. These methods enable the amount of specified fine particles contained in the metal particles to be adjusted to 0.1 to 2.0 mass %. As a result, in a resin material prepared by intentionally adding metal particles containing a specified amount of specified fine particles, reduction in the VOC property can be prevented and mold deposit during molding can be prevented. Further, a molded product having further high glossiness can be provided.

In the polyacetal resin composition of the present embodiment, the amount of the specified fine particles is 0.1 to 2.0 mass %, preferably 0.3 to 1.5 mass %, more preferably 0.4 to 1.2 mass %, and particularly preferably 0.5 to 1.0 mass %, with respect to the total amount of the aluminum pigment.

When the amount of the specified fine particles is equal to or higher than any of the above lower limits, excellent glossiness is achieved. Further, when the amount of the specified fine particles is equal to or lower than any of the above upper limits, reduction in the VOC property of the obtained molded article and mold deposit during molding can be prevented.

In the present embodiment, the aluminum pigment (B) preferably includes particles containing aluminum as the main component, and more preferably is composed only of particles containing aluminum. Note that "containing . . . as the main component" means that the content is 70 mass % or more with respect to the total amount of the aluminum pigment (B). The particles have a flat shape such as a coin-like shape and a flake-like shape.

Further, when (the particles composing) the aluminum pigment (B) have a flat shape, the volume average particle size ($D_{50}$) of (the particles composing) the aluminum pigment (B) is preferably 3 to 40 μm and the average particle thickness of (the particles composing) the aluminum pigment (B) is preferably 0.03 to 0.4 μm and more preferably is 0.08 to 0.4 μm. The aluminum pigment (B) can be used singly or in combinations of a plurality thereof.

In the present embodiment, the aluminum pigment (B) preferably has an appropriate oxide film on the surface thereof. When the aluminum particle has an appropriate oxide film, a high reflectance unique to aluminum can be maintained and the metal particle can keep corrosion resistance and stability over time.

The purity of the aluminum pigment (B) is not particularly limited, and the aluminum pigment may contain other metal as impurities or an alloy component as long as the effect of the present disclosure is not impaired. Examples of such impurities or an alloy component include Si, Fe, Cu, Mn, Mg, and Zn. For example, aluminum is contained in the amount of preferably 70 to 95 mass % and more preferably 78 to 92 mass % with respect to the total amount of aluminum pigment (B).

For example, the aluminum pigment (B) is obtained by preliminarily sorting an atomized powder, a cut powder, a foil powder, a deposited powder, or a metal powder obtained by other method, by primary classification or the like, thereafter performing a wet shaping processing treatment by a ball mill, an attritor, a planetary mill, a vibrating mill or the like under coexistence of a processing medium including a processing aid, a solvent, and the like, performing sieve classification in a wet state, and performing liquid-solid separation by a filter press or the like. This enables production of metal particles in which an uneven fracture surface present at an end of a flake is reduced.

The grinding medium is preferably used in the amount as small as possible in this step because the oxygen content in the particles increases when an excess amount of the grinding medium is added.

In the present embodiment, the aluminum pigment (B) has a flat shape such as a coin-like shape and a flake-like shape. The flat shape here mentioned refers to a shape having an average shape ratio (average particle thickness t/volume average particle size $D_{50}$) of preferably 0.2 or less, more preferably 0.1 or less, and even more preferably 0.05 or less. When the average shape ratio is within any of these ranges, the surface area of a portion having a high reflectance unique to a metal can be increased by addition of a small amount of metal particles. As a result, the brightness of a molded article can be efficiently increased with a small amount.

In the present embodiment, the content of the aluminum pigment (B) is 0.1 to 10 parts by mass, preferably 1 to 8 parts by mass, more preferably 1.5 to 7 parts by mass, and particularly preferably 2 to 6 parts by mass, per 100 parts by mass of the polyacetal resin.

When the content of the aluminum pigment is adjusted in any of the above ranges, a molded article of the resin composition of the present embodiment not only can more favorably keep mechanical properties originally possessed in the polyacetal resin, such as rigidity and impact resistance, and can be inhibited in generation of formaldehyde, but also can exhibit favorable glossiness.

In the present embodiment, the volume average particle size ($D_{50}$) of the aluminum pigment (B) is 3 to 40 μm, and is preferably 4 to 35 μm and more preferably 5 to 30 μm. The volume average particle size of the aluminum pigment in the range of 15 to 30 μm is particularly preferable because the effects of suppressing formaldehyde generation and improving glossiness are particularly increased, and the volume average particle size in the range of 5 to 15 μm is particularly preferable because the effect of improving the weather resistance is particularly increased. Note that the volume average particle size ($D_{50}$) and the average particle thickness can be measured by the methods described in Examples below.

((C) Lubricant)

The polyacetal resin composition of the present embodiment preferably further contains one or two or more lubricants (C). Lubricants generally reduce the viscosity of a resin melt and contribute to an improvement in the release property from a metal surface during molding. In addition to these advantages and effects, in the present embodiment, addition of a lubricant (C) also provides higher glossiness. These lubricants (C) can be used singly or in combinations of a plurality thereof.

Examples of the lubricant (C) in the present embodiment include, but are not limited to, hydrocarbon-based, higher fatty acid-based, higher alcohol-based, aliphatic amide-based, and metal soap-based lubricants. Among them, liquid paraffin which is a hydrocarbon-based lubricant is preferred from the viewpoint of having a low reactivity with the polyacetal resin (A) and smaller influences on the physical properties.

The amount of the lubricant (C) in the present embodiment is not particularly limited as long as extrusion and injection molding are not affected. For example, the amount is preferably 0.01 to 0.5 parts by mass, more preferably 0.05 to 0.45 parts by mass, and particularly preferably 0.1 to 0.4 parts by mass, per 100 parts by mass of the polyacetal resin (A). The amount of the lubricant (C) in any of the above range is preferable because a molded article having a high glossiness is obtained, and the operation state of an extruder during extrusion and measuring of the amount of the resin during injection molding and the like are stabilized.

(Formaldehyde Inhibitor (D))

The polyacetal resin composition of the present embodiment preferably further contains one or two or more formaldehyde inhibitors (D). Examples of the formaldehyde inhibitor (D) include an aminotriazine-based compound, a guanamine-based compound, a urea-based compound, and a carboxylic acid hydrazide-based compound. These formaldehyde inhibitors (D) can be used singly or in combinations of a plurality thereof.

Examples of the aminotriazine-based compound include melamine; melamine condensates such as melam, melem, and melon; melamine resins such as a melamine formaldehyde resin; and N-hydroxyarylalkyl melamine-based compounds such as N,N',N"-mono, bis, tris, tetrakis, pentakis, or hexakis (o-, m-, or p-hydroxyphenylmethyl)melamine.

Examples of the guanamine-based compound include aliphatic guanamine-based compounds such as valeroguanamine, caproguanamine, heptanoguanamine, capryloguanamine, and stearoguanamine; alkylene bisguanamines such as succinoguanamine, glutaroguanamine, adipoguanamine, pimeloguanamine, suberoguanamine, azeloguanamine, and sebacoguanamine; alicyclic guanamine-based compounds such as cyclohexane carboguanamine, norbornene carboguanamine, cyclohexene carboguanamine, norbornane carboguanamine, and functional group-substituted derivatives thereof; aromatic guanamine-based compounds such as benzoguanamine, α- or β-naphthoguanamine, and functional group-substituted derivatives thereof; polyguanamines such as phthaloguanamine, isophthaloguanamine, terephthaloguanamine, naphthalene diguanamine, and biphenylene diguanamine; aralkyl- or aralkyleneguanamines such as phenylacetoguanamine, β-phenylpropioguanamine, and o-, m-, or p-xylylenebisguanamine; and hetero atom-containing guanamine-based compounds such as acetal group-containing guanamines, dioxane ring-containing guanamines, tetraoxospiro ring-containing guanamines, and isocyanuric ring-containing guanamines.

Examples of the functional group-substituted derivatives with reference to the alicyclic guanamine-based compounds include derivatives where a cycloalkane residue is substituted with 1 to 3 functional groups such as an alkyl group, a hydroxy group, an amino group, an acetoamino group, a nitrile group, a carboxy group, an alkoxycarbonyl group, a carbamoyl group, an alkoxy group, a phenyl group, a cumyl group, and a hydroxyphenyl group.

Examples of the functional group-substituted derivatives with reference to the aromatic guanamine-based compounds include derivatives where a phenyl residue of benzoguanamine or a naphthyl residue of naphthoguanamine is substituted with 1 to 5 functional groups such as an alkyl group, a hydroxy group, an amino group, an acetoamino group, a nitrile group, a carboxy group, an alkoxycarbonyl group, a carbamoyl group, an alkoxy group, a phenyl group, a cumyl group, and a hydroxyphenyl group, and examples of such aromatic guanamine-based compounds include o-, m-, or p-toluguanamine, o-, m-, or p-xyloguanamine, o-, m-, or p-phenylbenzoguanamine, o-, m-, or p-hydroxybenzoguanamine, 4-(4'-hydroxyphenyl)benzoguanamine, o-, m-, or p-nitrilebenzoguanamine, 3,5-dimethyl-4-hydroxybenzoguanamine, and 3,5-di-t-butyl-4-hydroxybenzoguanamine.

Examples of the acetal group-containing guanamines include 2,4-diamino-6-(3,3-dimethoxypropyl-s-triazine.

Examples of the dioxane ring-containing guanamines include [2-(4'-6'-diamino-s-triazin-2'-yl)ethyl]-1,3-dioxane and [2-(4'-6'-diamino-s-triazin-2'-yl)ethyl]-4-ethyl-4-hydroxymethyl-1,3-dioxane.

Examples of the tetraoxospiro ring-containing guanamines include CTU-guanamine and CMTU-guanamine.

Examples of the isocyanuric ring-containing guanamines include 1,3,5-tris[2-(4',6'-diamino-s-triazin-2'-yl)ethyl]isocyanurate and 1,3,5-tris[3-(4',6'-diamino-s-triazin-2'-yl)propyl]isocyanurate.

Examples of the urea-based compound include a linear urea-based compound and a cyclic urea-based compound.

Examples of the linear urea-based compound include condensates of urea and formaldehyde, such as biurea, biuret, and formnitrogen, and polyalkylene or arylene urea, such as polynonamethyleneurea.

Examples of the cyclic urea-based compound include hydantoins, crotylidene diurea, acetyleneurea, mono-, di-, tri-, or tetraalkoxymethyl glycoluril such as mono-, di-, tri-, or tetramethoxymethyl glycoluril, cyanuric acid, isocyanuric acid, uric acid, and urazole. Examples of the hydantoins include hydantoin, 5-methylhydantoin, 5-ethylhydantoin, 5-isopropylhydantoin, 5-phenylhydantoin, 5-benzylhydantoin, 5,5-dimethylhydantoin, 5,5-pentamethylenehydantoin, 5-methyl-5-phenylhydantoin, 5,5-diphenylhydantoin, 5-(o-, m-, or p-hydroxyphenyl)hydantoin, 5-(o-, m-, or p-aminophenyl)hydantoin, allantoin, 5-methylallantoin, and metal salts such as Al salts of allantoin, such as dihydroxyaluminum allantoin salts.

Examples of the carboxylic acid hydrazide-based compound include an aliphatic carboxylic acid hydrazide-based compound, an alicyclic carboxylic acid hydrazide-based compound, and an aromatic carboxylic acid hydrazide-based compound.

Examples of the aliphatic carboxylic acid hydrazide-based compound include monocarboxylic acid hydrazides such as lauric acid hydrazide, stearic acid hydrazide, 12-hydroxystearic acid hydrazide, and 1,2,3,4-butanetetracarboxylic acid hydrazide; and polycarboxylic acid hydrazides such as succinic mono- or dihydrazide, glutaric acid mono- or dihydrazide, adipic acid mono- or dihydrazide, pimelic acid mono- or dihydrazide, suberic acid mono- or dihydrazide, azelaic acid mono- or dihydrazide, sebacic acid mono- or dihydrazide, dodecanedioic acid mono- or dihydrazide, hexadecanedioic acid mono- or dihydrazide, eicosandioic acid mono- or dihydrazide, and 7,11-octadecadiene-1,18-dicarbohydrazide.

Examples of the alicyclic carboxylic acid hydrazide-based compound include monocarboxylic acid hydrazides such as cyclohexanecarboxylic acid hydrazide; and polycarboxylic acid hydrazides such as dimer acid mono- or dihydrazide, trimer acid mono-, di-, or trihydrazide, 1,2-, 1,3-, or 1,4-cyclohexanedicarboxylic acid mono- or dihydrazide, and cyclohexanetricarboxylic acid mono-, di-, or trihydrazide.

Examples of the aromatic carboxylic acid hydrazide-based compound include monocarboxylic acid hydrazides such as benzoic acid hydrazide and functional group-substituted derivatives thereof, and α- or β-naphthoic acid hydrazide and functional group-substituted derivatives thereof; and polycarboxylic acid hydrazides such as isophthalic acid mono- or dihydrazide, terephthalic acid mono- or dihydrazide, 1,4- or 2,6-naphthalene dicarboxylic acid mono- or dihydrazide, 3,3'-, 3,4'-, or 4,4'-diphenyldicarboxylic acid mono- or dihydrazide, diphenyletherdicarboxylic acid mono- or dihydrazide, diphenylmethanedicarboxylic acid mono- or dihydrazide, diphenylethanedicarboxylic acid mono- or dihydrazide, diphenoxyethanedicarboxylic acid mono- or dihydrazide, diphenylsulfonedicarboxylic acid mono- or dihydrazide, diphenyl ketone dicarboxylic acid mono- or dihydrazide, 4,4"-terphenyldicarboxylic acid mono- or dihydrazide, 4,4'"-quaterphenyldicarboxylic acid mono- or dihydrazide, 1,2,4-benzenetricarboxylic acid mono-, di-, or trihydrazide, pyromellitic acid mono-, di-, tri-, or tetrahydrazide, and 1,4,5,8-naphthoic acid mono-, di-, tri-, or tetrahydrazide.

Examples of the benzoic acid hydrazide and functional group-substituted derivatives thereof include derivatives such as o-, m-, or p-methylbenzoic acid hydrazide, 2,4-, 3,4-, 3,5-, or 2,5-dimethylbenzoic acid hydrazide, o-, m-, or p-hydroxybenzoic acid hydrazide, o-, m-, or p-acetoxybenzoic acid hydrazide, 4-hydroxy-3-phenylbenzoic acid hydrazide, 4-acetoxy-3-phenylbenzoic acid hydrazide, 4-phenylbenzoic acid hydrazide, 4-(4'-phenyl)benzoic acid hydrazide, 4-hydroxy-3,5-dimethylbenzoic acid hydrazide, and 4-hydroxy-3,5-di-t-butylbenzoic acid hydrazide, in which a phenyl residue of benzoic acid hydrazide is substituted with 1 to 5 functional groups such as an alkyl group, a hydroxy group, an acetoxy group, an amino group, an acetoamino group, a nitrile group, a carboxy group, an alkoxycarbonyl group, a carbamoyl group, an alkoxy group, a phenyl group, a benzyl group, a cumyl group, and a hydroxyphenyl group.

Examples of the α- or β-naphthoic acid hydrazide and functional group-substituted derivatives thereof include 3-hydroxy-2-naphthoic acid hydrazide and 6-hydroxy-2-naphthoic acid hydrazide.

The above-mentioned formaldehyde inhibitor (D) can also be used in the form of being carried on a layered substance or a porous substance (hydrotalcite, montmorillonite, silica gel, alumina, titania, zirconia, sepiolite, smectite, palygorskite, imogolite, zeolite, activated carbon, or the like).

The formaldehyde inhibitor (D) used in the polyacetal resin composition of the present embodiment is preferably any of an aliphatic carboxylic acid hydrazide-based compound and an aromatic carboxylic acid hydrazide-based compound, and in particular, more preferably an aliphatic carboxylic acid hydrazide-based compound.

The content of the formaldehyde inhibitor (D) in the polyacetal resin composition of the present embodiment is preferably 0.01 to 5 parts by mass, more preferably 0.01 to 2 parts by mass, even more preferably 0.02 to 1 part by mass per 100 parts by mass of the polyacetal resin (A). The amount of the formaldehyde inhibitor (D) in any of the above range is preferred, because not only a sufficient effect of suppression of formaldehyde is obtained but also a mold deposit can be suppressed.

(Other Materials)

The polyacetal resin composition of the present embodiment can contain, if necessary, any coloring agent as such a complementary pigment in order to further enhance design. The coloring agent is not particularly limited and examples thereof include an organic pigment and an inorganic pigment. The coloring agent may be used singly or in combinations of two or more kinds thereof.

Examples of the organic pigment include a phthalocyanine-based pigment, a condensed azo-based pigment, an azo lake-based pigment, a quinacridone-based pigment, a dioxazine-based pigment, an isoindolinone-based pigment, and a condensed polycyclic pigment.

Examples of the inorganic pigment include simple oxides such as a zinc flower, titanium dioxide, rouge, chromium oxide, and iron black, sulfides such as cadmium yellow, cadmium orange, and cadmium red, chromic acid salts such as chrome yellow, zinc yellow, and chromium vermilion, ferrocyanides such as ferric hexacyanoferrate, silicates such as ultramarine, carbon black and mica-based pearl pigment.

The amount of the coloring agent is preferably 0.0001 to 2 parts by mass, more preferably 0.0005 to 1 part by mass per 100 parts by mass of the polyacetal resin (A). When the amount of the coloring agent is in any of the above ranges, the effect of enhancing design is obtained without any reduction in mechanical strength of the molded article, and, in particular, any promotion of generation of formaldehyde of the polyacetal resin (A).

The polyacetal resin composition of the present embodiment may further contain, as desired, various inorganic fillers, other thermoplastic resin, a softening agent, a crystal nucleating agent, and a release agent which are conventionally used, as long as the object of the present disclosure is not impaired.

(Production Method)

The polyacetal resin composition of the present embodiment is obtained by, for example, mixing a part of each of the raw materials while melting it, by use of a melt-kneading machine commonly used. Examples of the melt-kneading machine include a kneader, a roll mill, a single screw extruder, a twin screw extruder, and a multi-screw extruder.

When the polyacetal resin composition of the present embodiment is produced by melt-kneading, the temperature of melt-kneading may be selected according to the melting point or the softening point of the polyacetal resin (A) to be used. The temperature of the melt-kneading is preferably higher than the melting point or softening point of the polyacetal resin (A) by 1 to 100° C., more preferably by 10 to 60° C., and even more preferably by 20 to 50° C. The melting point or softening point of the polyacetal resin (A) can be determined by differential scanning calorimetry (DSC) according to JIS K7121. It is preferable for retaining the quality and the working environment that the system be subjected to replacement with an inert gas and/or degassing using single-stage and multi-stage vents.

When the polyacetal resin (A) is pelletized, for the purpose of maintaining uniform dispersion of each component including the aluminum pigment (B) in the polyacetal resin (A), it is preferable to perform melt-kneading after adding a stabilizer (an antioxidant, a scavenger of formaldehyde or formic acid and a weathering stabilizer, the formaldehyde inhibitor (D), and the like) using a spreading agent, if necessary, followed by mixing, and then adding the aluminum pigment (B) and the lubricant (C), if necessary.

When the polyacetal resin (A) is pelletized, alternatively, it is also preferable to perform melt-kneading after pulverizing some or all of the pellets into a powder form, mixing a stabilizer (an antioxidant, a scavenger of formaldehyde or formic acid and a weathering stabilizer, the formaldehyde inhibitor (D), and the like) using the powdery polyacetal resin (A) and a spreading agent, if necessary, and then adding the aluminum pigment (B) and the lubricant (C), if necessary.

Examples of the spreading agent include an aliphatic hydrocarbon, an aromatic hydrocarbon and modified products thereof, and a mixture thereof (such as mineral oil), and an fatty acid ester of a polyol. For preventing damage to the aluminum pigment (B) in the blending step, blending in a later stage is preferred.

Further, during production of the polyacetal resin composition of the present embodiment, it is also possible to melt-knead the polyacetal resin (A) and the stabilizer (at least one selected from an antioxidant, a scavenger of formaldehyde or formic acid, and a weathering stabilizer) beforehand. A commonly used melt kneader can be used for the preliminary kneading. The temperature of the melt-kneading is selected according to the melting point or the softening point of the polyacetal resin (A) to be used. The temperature is preferably higher than the melting point or softening point of the polyacetal resin (A) by 1 to 100° C., more preferably by 10 to 60° C., and even more preferably by 20 to 50° C. Examples of the melt-kneading machine include a kneader, a roll mill, a single screw extruder, a twin screw extruder, and a multi-screw extruder, for example. It is preferable for retaining the quality and the working environment that the system be subjected to replacement with an inert gas and/or degassing using single-stage and multi-stage vents.

(Molded Article)

The polyacetal resin composition of the present embodiment can be molded to produce a molded article.

Examples of the production method of the molded article include well-known molding methods such as extrusion molding, injection molding, vacuum molding, blow molding, injection compression molding, decoration molding, gas-assisted injection molding, expansion injection molding, low-pressure molding, ultrathin injection molding (ultra-high-speed injection molding), and in-mold composite molding (insert molding and outsert molding). In particular, from the viewpoint of the quality, the production stability, the cost performance, and the like, injection molding, injection compression molding, and a molding method in which either of these molding methods are combined with an in-mold composite molding are preferred.

Further, a molded product having two or more layers and having desired characteristics and appearance can be produced through adhesion (any method can be used such as ultra sonic adhesion, high frequency adhesion, hot plate adhesion, thermal press molding, multilayer injection molding, multilayer blow molding, and the like) of the polyacetal resin composition of the present embodiment to any of various resins containing a rubber and/or an elastomer. This enables to impart excellent performances (e.g., impact resistance, slidability, and chemical resistance) of various resins thereby producing a molded article having an appearance of an excellent design.

(Characteristics)

The amount of formaldehyde generated of the polyacetal resin composition of the present embodiment is preferably 3 mg/kg or less, more preferably 2.5 mg/kg or less.

The amount of formaldehyde generated can be measured by a method described in Examples below.

The glossiness immediately after injection molding of the polyacetal resin composition of the present embodiment is preferably 60 or more, more preferably 70 or more.

(Applications)

A molded product of the polyacetal resin composition of the present embodiment can be used particularly in interior/exterior components provided with mechanical sections and/or sliding sections. For example, the molded product is used as any component selected from the group consisting of components provided on OA equipment, music, video or information equipment, or communication equipment, industrial components provided on office furniture or housing equipment, and interior and exterior components for automobiles. In particular, the molded product is suitably used as any component selected from the group consisting of handles, switches and buttons demanded to have an excellent appearance. Furthermore, the molded product obtained from the resin composition of the present embodiment, when a design surface is imparted thereonto during molding with an emboss mold or by emboss processing, is preferably used as an appearance component, because the effect of improvement in appearance is exerted.

The resin composition of the present embodiment can provide a molded product which has gloss without requiring additional processing such as plating or paint application onto the surface, and which generates less formaldehyde and has a good weather resistance. Furthermore, the molded product obtained from the polyacetal resin composition according to the present embodiment has favorable appearance properties as described above, and therefore has an excellent appearance favorable in practical use even if no paint is applied. Accordingly, an appearance excellent in design is efficiently obtained without any solvent. The polyacetal resin composition of the present embodiment is excellent in production stability, can be produced under a favorable working environment, and is also excellent in terms of the cost and the environment.

EXAMPLES

Hereinafter, the present disclosure will be specifically described with reference to Examples, but the present disclosure is not intended to be limited to the Examples described below. Hereinafter, the raw material components used in Examples and Comparative Examples will be described.

<Polyacetal Resin (A)>

TENAC-C 4513 (melting point: 165° C.) (manufactured by Asahi Kasei Corporation) was used as a polyacetal copolymer (a-1).

<Aluminum Pigment (B)>

Aluminum particles obtained by the following methods were used as aluminum pigments (b-1) to (b-6).

—Preparation of Aluminum Pigment (b-1)—

A ball mill having an inner diameter of 30 cm and a length of 35 cm was filled with a formulation including 250 g of an atomized aluminum powder (volume average particle size: 3.2 µm), 1.2 kg of mineral spirit, and 25 g of stearic acid, and the formulation was ground using 15 kg of glass beads having a diameter of 3 mm (specific gravity: 2.6) at 60 rpm for 10 hours. After completion of the grinding, a slurry in the mill was washed out with mineral spirit and subjected to a 400-mesh vibration sieve. The slurry passing through the sieve was allowed to stand for 30 minutes, to separate the sediment and the liquid phase to obtain the sediment. Mineral spirit in a doubled volume were added to the sediment, and the mixture was stirred, mixed, and then allowed to stand for 30 minutes. The procedure of separating the sediment and the liquid phase was repeated 10 times to obtain an aluminum pigment precursor (b'-1).

—Preparation of fine aluminum particles (b'-0)—

A ball mill having an inner diameter of 30 cm and a length of 35 cm was filled with 250 g of an atomized aluminum powder (volume average particle size: 3.2 µm), and the atomized aluminum powder was ground using 15 kg of glass beads having a diameter of 3 mm (specific gravity: 2.6) at 60 rpm for 20 hours. The resultant pulverized product was then classified by a cyclone-type classifier to obtain aluminum fine particles (b'-0) having a particle diameter of 1 µm or less (specifically, an average particle size of 0.5 µm) as specified fine particles.

The aluminum fine particles (b'-0) were added to the aluminum pigment precursor (b'-1) so that the aluminum fine particles (b'-0) amounted to 1 mass % with respect to the total amount of the aluminum pigment. A doubled volume of mineral spirit was then added, and the mixture was stirred, mixed, and then allowed to stand for 30 minutes. The sediment and the liquid phase were separated, and a further filtration through a filter and concentration were carried out to obtain an aluminum pigment (b-1) having a nonvolatile content of 90%.

The particle size distribution of the resultant aluminum pigment (b-1) was measured by a laser diffraction particle size distribution measuring apparatus (trade name "SALD-2300" manufactured by Shimadzu Corporation), and the volume average particle size $D_{50}$ of the aluminum pigment was determined by the 50% value of the resulting particle size distribution. The measurement solvent used was mineral spirit, and the aluminum pigment serving as a sample was subjected to ultrasonic dispersion for 3 minutes as a pre-treatment. $D_{50}$ was determined to be 10 µm. Note that the average particle size of the fine aluminum particles (b'-0) was also measured in the similar manner by the laser diffraction particle size distribution measuring apparatus (trade name "SALD-2300" manufactured by Shimadzu Corporation).

—Preparation of Aluminum Pigments (b-2) to (b-3)—

Aluminum pigments (b-2) to (b-3) containing different amounts of fine particles were prepared in the same procedure as that for the aluminum pigment (b-1) described above while changing the amount of aluminum fine particles (b'-0) having a particle diameter of 1 µm or less (average particle size of 0.5 µm) to be added to the aluminum pigment precursor (b'-1).

An aluminum pigment (b-2): It had $D_{50}$ of 10 µm, and contained 0.5 mass % of the aluminum fine particles (b'-0) with respect to the total amount of the aluminum pigment (b-2).

An aluminum pigment (b-3): It had $D_{50}$ of 10 µm, and contained 3.0 mass % of the aluminum fine particles (b'-0) with respect to the total amount of the aluminum pigment (b-3).

—Preparation of aluminum pigments (b-4) to (b-6)—

Aluminum pigments (b-4) to (b-6) having different volume average particle sizes were prepared in the same procedure as that for the aluminum pigment (b-1) described above while changing the particle diameter and the grinding time of the atomized aluminum powder.

An aluminum pigment (b-4): It had $D_{50}$ of 6 µm, and contained 1.0 mass % of the aluminum fine particles (b'-0) with respect to the total amount of the aluminum pigment.

An aluminum pigment (b-5): It had $D_{50}$ of 23 µm, and contained 1.0 mass % of the aluminum fine particles (b'-0) with respect to the total amount of the aluminum pigment.

An aluminum pigment (b-6): It had $D_{50}$ of 45 µm, and contained 1.0 mass % of the aluminum fine particles (b'-0) with respect to the total amount of the aluminum pigment.

—Preparation of Aluminum Pigment (b-0)—

An aluminum pigment precursor (b'-1) was obtained by the same procedure as in that in the preparation method of the aluminum pigment (b-1) described above. A doubled volume of mineral spirit was then added, and the mixture was stirred, mixed, and then allowed to stand for 30 minutes. The sediment and the liquid phase were separated, and a further filtration through a filter and concentration were carried out to obtain an aluminum pigment (b-0) having a nonvolatile content of 90%. $D_{50}$ was determined to be 10 µm, and no aluminum fine particles with a particle diameter of 1 µm or less as particular fine particles were detected.

<Lubricant (C)>

Liquid paraffin (c-1): trade name "Smoil PS-260" (manufactured by MATSUMURA OIL Co., Ltd.)

<Formaldehyde Inhibitor (D)>

Formaldehyde inhibitor (d-1): sebatic acid dihydrazide (manufactured by JAPAN FINECHEM COMPANY, INC.)

Formaldehyde inhibitor (d-2): adipic acid dihydrazide (manufactured by JAPAN FINECHEM COMPANY, INC.)

Formaldehyde inhibitor (d-3): dodecanedioic acid dihydrazide (manufactured by JAPAN FINECHEM COMPANY, INC.)

<(2) Evaluation Methods>

<Occurrence of Mold Deposit (MD)>

Pellets produced in each of examples and comparative examples which will be described below were molded using an injection molding machine (trade name "IS-100GN" manufactured by Toshiba Machine Co., Ltd.) under injection conditions of a cylinder temperature of 220° C., an injection time of 15 seconds, a cooling time of 20 seconds, and a mold temperature of 77° C., thereby producing a specimen. The specimen was produced using a mold having a length of 130 mm, a width of 110 mm, and a thickness of 3 mm.

Mold deposit (MD) in this evaluation refers to mold deposit caused by adhesion of additives contained in pellets, fine particles, or the like in a aluminum pigment to the surface of the specimen. An evaluation was made in accordance with the following criteria: A: no MD of the specimen to the surface of the mold was observed under a visual observation; B: MD with an area of less than 5 mm$^2$ was observed; C: MD with an area of 5 mm$^2$ or more and less than 10 mm$^2$ was observed; and D: MD with an area of 10 mm$^2$ or more was observed.

<Measurement of Lightness>

Pellets produced in each of examples and comparative examples which will be described below were dried at 80° C. for 3 hours, and were molded using a 5-ounce molding machine (trade name "IS-100GN" manufactured by Toshiba Machine Co., Ltd.) set to a cylinder temperature of 220° C. under injection conditions of a mold temperature of 77° C. and a cooling time of 20 seconds, thereby producing a flat-plate specimen having a size of 100 mm×100 mm, and a thickness of 3 mm.

The L* value at 25° of the specimen was measured using a multi-angle digital gloss meter (CM-512m3A manufactured by Konica Minolta Inc.).

<Weathering Resistance>

Pellets produced in each of examples and comparative examples which will be described below were dried at 80° C. for 3 hours, and were molded using the injection molding machine (trade name "IS-100GN" manufactured by Toshiba Machine Co., Ltd.) under injection conditions of a cylinder temperature of 220° C., an injection time of 15 seconds, a cooling time of 20 seconds, and a mold temperature of 77° C., thereby producing a specimen. The specimen was produced using a mold having a length of 100 mm, a width of 100 mm, and a thickness of 3 mm.

The specimen was irradiated vertically with a 6-watt handy UV lamp (trade name "UVM-57" manufactured by UVP, LLC) disposed apart from the specimen by 150 mm, in a dark room.

After the specimen was irradiated for 10 consecutive days, the L* value at 25° was measured in the same manner as the measurement of the lightness. This value was compared with the value immediately after the preparation of the specimen.

<Glossiness>

Pellets produced in each of examples and comparative examples which will be described below were molded using the injection molding machine (trade name "IS-100GN" manufactured by Toshiba Machine Co., Ltd.) under injection conditions of a cylinder temperature of 220° C., an injection time of 15 seconds, a cooling time of 20 seconds, and a mold temperature of 77° C., thereby producing a specimen. The specimen was produced using a mold having a length of 90 mm, a width of 50 mm, and a thickness of 2.5 mm.

The glossiness of a molded article was measured at an angle of 60° of the surface of a molded article according to JIS Z8741 using a glossmeter IG-320 manufactured by HORIBA Ltd.

In general, a higher glossiness is considered to relate to a smoother surface of a molded article and higher followability to the surface of the mold. The glossiness of a molded product was measured twice: immediately after production of the molded product through injection molding, and after the molded product was allowed to stand for 48 hours in an environment of temperature 80° C. and a humidity of 90% in a constant temperature and constant humidity chamber "PL-2KT" manufactured by ESPEC CORP.

<Amount of Formaldehyde Generated (VDA275)>

Pellets produced in each of examples and comparative examples which will be described below were molded using the injection molding machine (trade name "IS-100GN" manufactured by Toshiba Machine Co., Ltd.) under injection conditions of a cylinder temperature of 220° C., an injection time of 15 seconds, a cooling time of 20 seconds, and a mold temperature of 77° C., thereby producing a specimen.

Next, the amount of formaldehyde released from the specimen was determined by the following method (VDA275 method).

First, 50 mL of distilled water and a specimen (sheet of 100 mm in length×40 mm in width×3 mm in thickness) were placed in a 500-mL polyethylene container and the container was sealed, and the resultant was heated at 60° C. for 3 hours. Thereafter, formaldehyde in the distilled water was reacted with acetylacetone in the presence of an ammonium ion. The reaction product was subjected to measurement of an absorption peak at a wavelength of 412 nm by an UV spectrometer, and the amount of formaldehyde generated (mg/kg) was determined.

<Preparation of Polyacetal Resin Compositions and Evaluation Results>

Example 1

After 100 parts by mass of the polyacetal copolymer (a-1) and 0.08 parts by mass of the sebatic acid dihydrazide (d-1) were blended in a mixer, 3.0 parts by mass of the aluminum pigment (b-1) was added and blended. The mixture was melt-kneaded (melt-mixed) by use of a single screw extruder equipped with a 30-mm vent with being degassed through the vent, under conditions of a set temperature of 200° C., a rotation speed of 80 rpm, and an amount of discharge of 10 kg/hour to obtain pellets. After the resultant pellets were dried at 80° C. for 3 hours, the evaluations described above were carried out. The composition ratio and evaluation results are summarized in Table 1.

Examples 2 to 12 and 17 to 20, and Comparative Examples 1 to 6 and 9 to 11

Compositions were prepared and the above-described evaluations were carried out in the same manner as in Example 1 except that the compositions of the polyacetal resin (A), the aluminum pigment (B), and the formaldehyde inhibitor (D) were as listed in Table 1. The composition ratios and evaluation results are summarized in Table 1.

Example 13

After 100 parts by mass of the polyacetal copolymer (a-1), 0.30 parts by mass of the liquid paraffin (c-1), and 0.08 parts by mass of the sebatic acid dihydrazide (d-1) were blended in a mixer, 3.0 parts by mass of the aluminum pigment (b-1) was added and blended. The mixture was melt-kneaded (melt-mixed) by use of a single screw extruder equipped with a 30-mm vent with being degassed through the vent, under conditions of a set temperature of 200° C., a rotation speed of 80 rpm, and an amount of discharge of 10 kg/hour to obtain pellets. After the resultant pellets were dried at 80° C. for 3 hours, the evaluations described above were carried out. The composition ratio and evaluation results are summarized in Table 1.

Examples 14 to 16 and Comparative Examples 7, 8 and 12

Productions and measurements were carried out in the same manner as in Example 13 except that the compositions of the polyacetal resin (A), the aluminum pigment (B), the lubricant (C), and the formaldehyde inhibitor (D) were as listed in Table 1. The composition ratios and evaluation results are summarized in Table 1.

TABLE 1

| Table 1 | | Polyacetal resin (A) | | Aluminum pigment (b) | | Lubricant (c) | | Inhibitor (d) | | Amount of formaldehyde generated (mg/kg) | Mold deposit (MD) | Glossiness | Lightness | |
|---|---|---|---|---|---|---|---|---|---|---|---|---|---|---|
| | | Type | Amount (parts by mass) | Type | Amount (parts by mass) | Type | Amount (parts by mass) | Type | Amount (parts by mass) | | | | Right after production | After 10-day irradiation |
| Example | 1 | (a-1) | 100 | (b-1) | 3.0 | — | — | (d-1) | 0.08 | 1.3 | A | 70.3 | 90.1 | 89.2 |
| | 2 | (a-1) | 100 | (b-1) | 3.0 | — | — | (d-2) | 0.08 | 1.4 | A | 70.6 | 90.2 | 89.4 |
| | 3 | (a-1) | 100 | (b-1) | 3.0 | — | — | (d-3) | 0.10 | 1.5 | A | 70.0 | 90.0 | 88.9 |
| | 4 | (a-1) | 100 | (b-2) | 3.0 | — | — | (d-1) | 0.08 | 1.2 | A | 70.1 | 90.3 | 89.4 |
| | 5 | (a-1) | 100 | (b-2) | 3.0 | — | — | (d-2) | 0.10 | 1.3 | A | 70.3 | 90.5 | 89.7 |
| | 6 | (a-1) | 100 | (b-2) | 3.0 | — | — | (d-3) | 0.08 | 1.4 | A | 69.9 | 90.1 | 89.0 |
| | 7 | (a-1) | 100 | (b-4) | 3.0 | — | — | (d-1) | 0.08 | 1.6 | A | 68.1 | 95.7 | 94.7 |
| | 8 | (a-1) | 100 | (b-4) | 3.0 | — | — | (d-2) | 0.08 | 1.7 | A | 68.3 | 96.1 | 95.2 |
| | 9 | (a-1) | 100 | (b-4) | 3.0 | — | — | (d-3) | 0.10 | 1.8 | A | 67.9 | 95.5 | 94.4 |
| | 10 | (a-1) | 100 | (b-5) | 3.0 | — | — | (d-1) | 0.08 | 0.9 | A | 80.2 | 88.1 | 87.2 |
| | 11 | (a-1) | 100 | (b-5) | 3.0 | — | — | (d-2) | 0.08 | 1.0 | A | 80.4 | 88.1 | 87.3 |
| | 12 | (a-1) | 100 | (b-5) | 3.0 | — | — | (d-3) | 0.10 | 1.1 | A | 79.9 | 87.9 | 86.8 |
| | 13 | (a-1) | 100 | (b-1) | 3.0 | (c-1) | 0.30 | (d-1) | 0.08 | 1.3 | A | 75.1 | 90.2 | 89.3 |
| | 14 | (a-1) | 100 | (b-2) | 3.0 | (c-1) | 0.30 | (d-1) | 0.08 | 1.2 | A | 75.0 | 90.3 | 89.4 |
| | 15 | (a-1) | 100 | (b-4) | 3.0 | (c-1) | 0.30 | (d-1) | 0.08 | 1.6 | A | 73.1 | 95.9 | 94.9 |
| | 16 | (a-1) | 100 | (b-5) | 3.0 | (c-1) | 0.30 | (d-1) | 0.08 | 0.9 | A | 85.2 | 88.7 | 87.8 |
| | 17 | (a-1) | 100 | (b-1) | 6.0 | — | — | (d-1) | 0.08 | 2.1 | A | 65.3 | 92.2 | 91.5 |
| | 18 | (a-1) | 100 | (b-2) | 6.0 | — | — | (d-1) | 0.08 | 1.9 | A | 65.1 | 92.5 | 91.8 |
| | 19 | (a-1) | 100 | (b-4) | 6.0 | — | — | (d-1) | 0.08 | 2.4 | A | 60.0 | 98.1 | 97.3 |
| | 20 | (a-1) | 100 | (b-5) | 6.0 | — | — | (d-1) | 0.08 | 1.5 | A | 69.8 | 90.2 | 89.5 |
| Comparative Example | 1 | (a-1) | 100 | (b-0) | 3.0 | — | — | (d-1) | 0.08 | 1.3 | A | 45.2 | 90.2 | 85.7 |
| | 2 | (a-1) | 100 | (b-0) | 3.0 | — | — | (d-2) | 0.08 | 1.4 | A | 45.4 | 90.2 | 85.8 |
| | 3 | (a-1) | 100 | (b-0) | 3.0 | — | — | (d-3) | 0.10 | 1.5 | A | 44.6 | 90.1 | 85.4 |
| | 4 | (a-1) | 100 | (b-3) | 3.0 | — | — | (d-1) | 0.08 | 3.3 | D | 70.3 | 87.1 | 86.2 |
| | 5 | (a-1) | 100 | (b-3) | 3.0 | — | — | (d-2) | 0.08 | 3.5 | D | 70.5 | 87.3 | 86.5 |
| | 6 | (a-1) | 100 | (b-3) | 3.0 | — | — | (d-3) | 0.10 | 3.8 | D | 69.9 | 87.0 | 86.0 |
| | 7 | (a-1) | 100 | (b-0) | 3.0 | (c-1) | 0.30 | (d-1) | 0.08 | 1.3 | A | 50.3 | 90.0 | 85.5 |
| | 8 | (a-1) | 100 | (b-3) | 3.0 | (c-1) | 0.30 | (d-1) | 0.08 | 3.2 | D | 75.1 | 87.2 | 86.3 |
| | 9 | (a-1) | 100 | (b-6) | 3.0 | — | — | (d-1) | 0.08 | 1.0 | C | 70.5 | 75.1 | 74.6 |
| | 10 | (a-1) | 100 | (b-6) | 3.0 | — | — | (d-2) | 0.08 | 1.1 | C | 70.7 | 75.3 | 74.9 |
| | 11 | (a-1) | 100 | (b-6) | 3.0 | — | — | (d-3) | 0.10 | 1.3 | C | 70.2 | 75.0 | 74.3 |
| | 12 | (a-1) | 100 | (b-6) | 3.0 | (c-1) | 0.30 | (d-1) | 0.08 | 1.0 | C | 75.4 | 77.0 | 76.5 |

As can seem from the experimental results in Table 1, in Examples 1 to 20 in which the aluminum pigments (B) containing fine particles with a particle diameter of 1 μm or less in a specified amount were used, the glossiness and lightness were higher as compared to Comparative Examples 1 to 3 and 7 containing an aluminum pigment free of specified fine particles added thereto, and the high lightness was maintained even after 10 days. In particular, in Examples 13 to 16 in which the liquid paraffin (C) was further added as a lubricant, a higher glossiness was achieved as compared to the examples where no lubricant was used.

On the other hand, in Comparative Examples 4 to 6 and 8 including the aluminum pigments in which the contents of particles with a particle diameter of 1 μm or less (specified fine particles) exceeded the predetermined range, the values of VDA275 sharply increased as compared to Examples 1 to 20 including the aluminum pigments containing particles with a particle diameter of 1 μm or less in the predetermined range, and mold deposit occurred during molding. In addition, in Comparative Examples 9 to 12 including the aluminum pigment having a volume average particle size out of the range of 3 to 40 μm, sufficient lightness was not achieved and some mold deposit during molding was observed.

INDUSTRIAL APPLICABILITY

The resin composition of the present disclosure has industrial applicability as a material of a member for design components.

The invention claimed is:

1. A polyacetal resin composition comprising:
   100 parts by mass of a polyacetal resin (A); and
   0.1 to 10 parts by weight of an aluminum pigment (B),
   the aluminum pigment (B) containing 0.1 to 2.0 mass % of particles with a particle diameter of 1 μm or less with respect to a total amount of the aluminum pigment (B), and a volume average particle size of the aluminum pigment (B) being 3 to 40 μm.

2. The polyacetal resin composition according to claim 1, further comprising a lubricant (C).

3. The polyacetal resin composition according to claim 1 wherein, 1 to 4 parts by mass of the aluminum pigment (B) is contained per 100 parts by mass of the polyacetal resin (A).

4. The polyacetal resin composition according to claim 2 wherein, 1 to 4 parts by mass of the aluminum pigment (B) is contained per 100 parts by mass of the polyacetal resin (A).

* * * * *